United States Patent

Maurice

[15] 3,643,764
[45] Feb. 22, 1972

[54] DISC BRAKE, ACTUATOR, AND ADJUSTING MEANS
[72] Inventor: Jean Maurice, Paris, France
[73] Assignee: Societe Anonyme Francaise Du Ferodo, Paris, France
[22] Filed: Dec. 29, 1969
[21] Appl. No.: 888,356
[30] Foreign Application Priority Data
  Dec. 31, 1968 France........................182405
[52] U.S. Cl..........................188/71.8, 188/196 B
[51] Int. Cl..........................F16d 65/52
[58] Field of Search..........188/71.8, 196 P, 196 B, 726

[56] References Cited
UNITED STATES PATENTS 2,888,104  5/1959  Frayer.......................188/71.8
3,459,282  8/1969  Hoenick et al................188/71.8

Primary Examiner—George E. A. Halvosa
Attorney—Young & Thompson

[57] ABSTRACT

A disc-brake system comprising a hydraulic control, a mechanical control, and means for automatically taking up play due to wear of the brake shoes, the said means comprising essentially a notched rod carried by one of the two pistons of the hydraulic operating system and a notched core engaged on the said rod, locking means being provided actuated by the mechanical control for putting the notches of the core into engagement with those of the notched rod.

24 Claims, 17 Drawing Figures

PATENTED FEB 22 1972 3,643,764
SHEET 1 OF 5
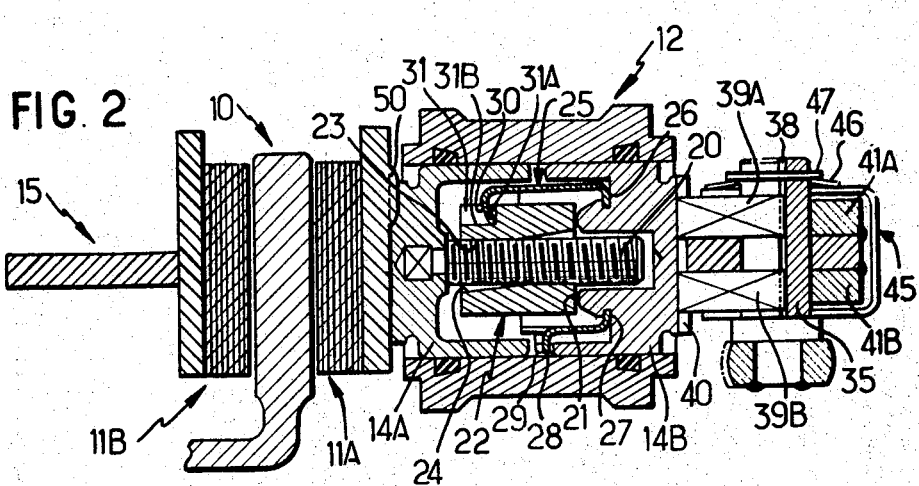
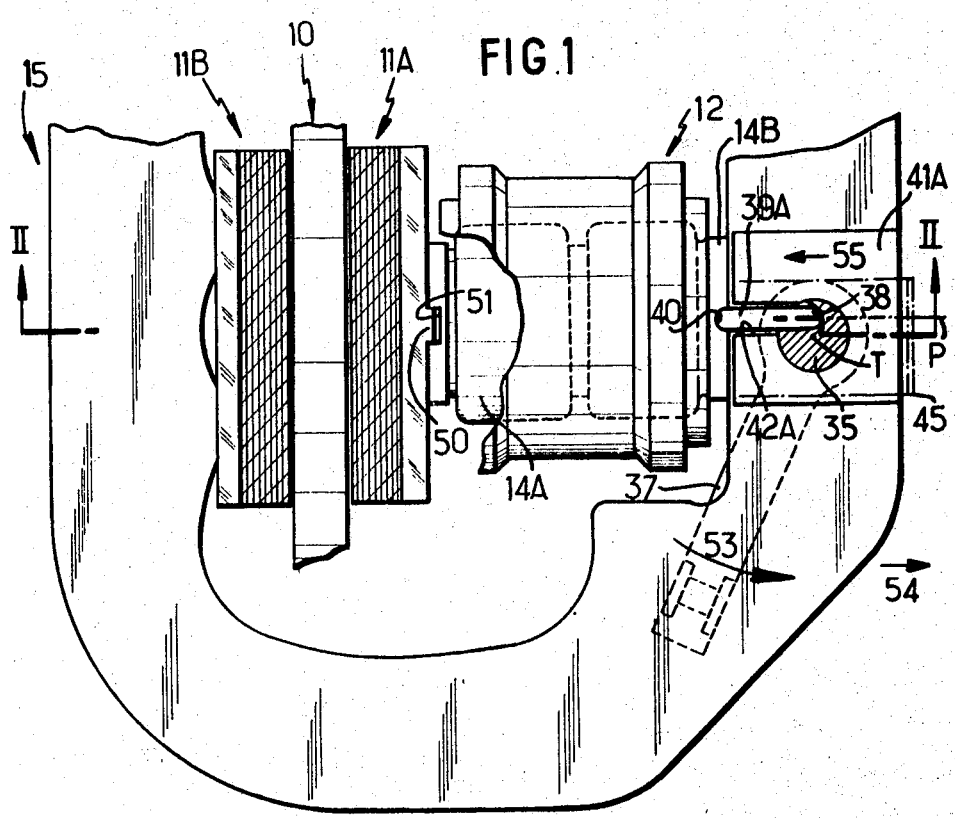
INVENTOR
JEAN MAURICE
By Young & Thompson
ATTYS.

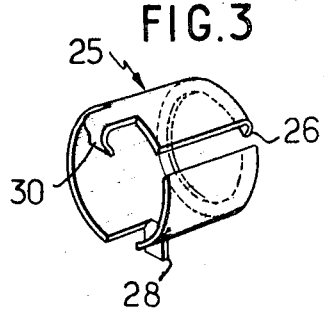
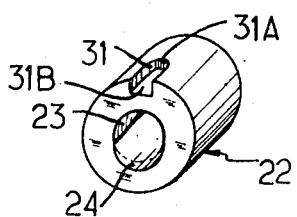
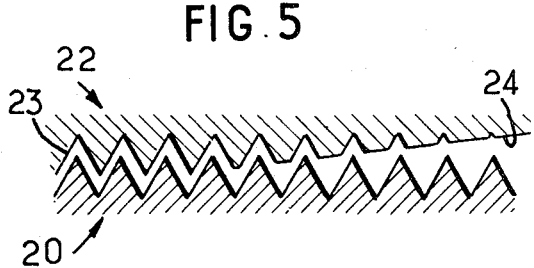
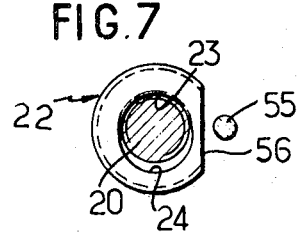
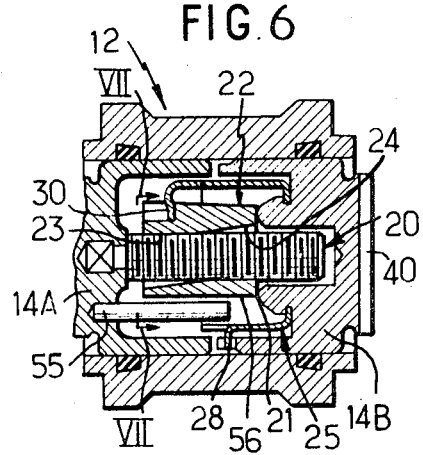
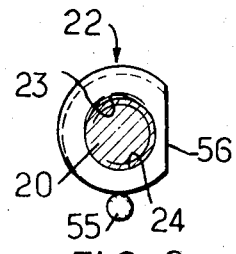
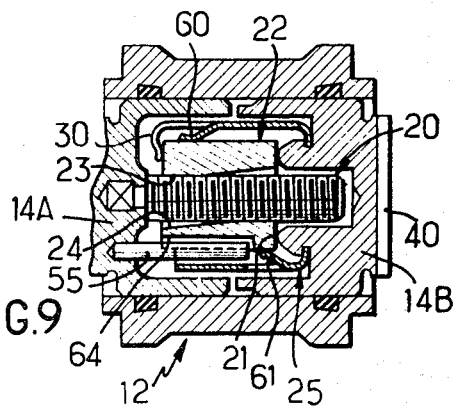

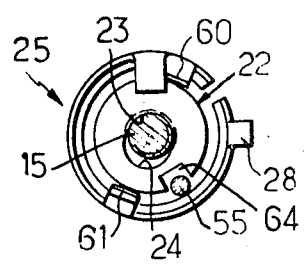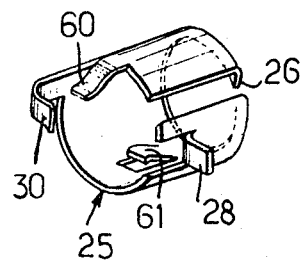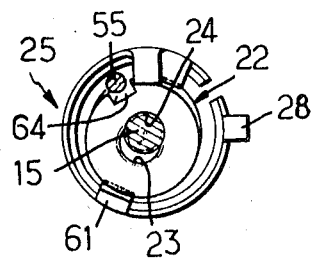

DISC BRAKE, ACTUATOR, AND ADJUSTING MEANS

The present invention relates to disc brakes of the kind comprising a disc rigidly fixed for rotation to the member to be braked, two brakeshoes arranged on each side of the said disc and movable perpendicularly to this latter, an actuation unit in which two pistons slide perpendicularly to the disc, one piston acting directly on one of the said shoes, a transfer member movable with respect to the disc, on which the other piston acts and which transmits the corresponding effort to the other shoe, a mechanical control and means for automatically taking up the play due to the wear of the shoes.

The present invention has for its object a brake of the type described above, and is characterized in that the means for taking up the play due to wear of the brakeshoes comprise a notched rod carried by a first of the said pistons in the axis of the actuation unit and provided peripherally with notches, a core provided axially with a bore having notches complementary to those of the said rod and engaged on this latter, the said core being additionally provided with a smooth bore which intercepts obliquely its notched bore, locking means actuated by the mechanical control for putting the notches of the said core into engagement with the notches of the said rod, these means comprising a flat face perpendicular to the axis of the actuation unit and cooperating with that of the transverse faces of the said core which is nearest to the second of the said pistons, and elastic means for urging the said core in a direction which brings the notches of the core towards the notches of the said rod.

If, during braking, wear of the shoes takes place such that the said core and the said rod move axially with respect to each other by a distance sufficient to cross over one of their notches, this movement and therefore the corresponding movement of the pistons of the actuation unit is irreversible, thereby compensating for the said wear.

According to a preferred form of construction, rocking means are provided to rock the notched core about an axis perpendicular to the notched rod when the piston which carries this latter is pivoted about its axis through a certain angle.

It is thus possible, for example for changing the brakeshoes, to obtain very rapidly a disengagement of the notched core with respect to the notched rod, that is to say the freeing of this core from the said rod, and therefore to return the pistons of the hydraulic actuation unit very rapidly to their initial position.

In addition, the arrangement according to the invention, by which the automatic means for taking up play due to wear of the brakeshoes are releasable unidirectional coupling means interposed directly between the pistons of the actuation unit, results in particularly robust constructions, characterized in that the pistons, coupled to each other by the said taking up means, form conjointly a coupling and can thus be both displaced in the same direction by the mechanical control. This latter acts, on the one hand between the moving system formed by the pistons of the actuation unit coupled to each other by the automatic means for taking up play due to their wear, and on the other hand another member such as any of the brakeshoes, the transfer member or the fixed support.

According to a preferred form of embodiment, this mechanical control is interposed between the second piston and the transfer member.

In the case, for example, of a disc brake fitted on an automobile vehicle, a mechanical control of this kind can for example serve the purpose of permitting manual operation of the said brake.

According to the invention, this mechanical control is wholly external to the actuation unit, which advantageously preserves the integrity of this latter and thus makes it possible to avoid the necessity for special sealing joints.

The characteristic features and advantages of the invention will furthermore be brought out in the description which follows below, given by way of example with reference to the accompanying diagrammatic drawings, in which:

FIG. 1 is a partial plan view with parts broken away and certain parts removed, of a brake according to the invention;

FIG. 2 is a view in cross section of this plan, taken along the broken line II—II;

FIG. 3 is a perspective view of one of the elements of this brake;

FIG. 4 is a perspective view of another element of this brake;

FIG. 5 is a diagrammatic view in cross section of a detail of this brake, to a large scale;

FIG. 6 is a partial view in axial section, similar to FIG. 2, of an alternative form of construction;

FIG. 7 is a view in transverse section of this alternative, taken along the line VII—VII of FIG. 6, for one position of operation of the brake;

FIG. 8 is a view similar to FIG. 7, for another position of operation of the brake;

FIGS. 9 to 11 are respectively similar to FIGS. 6 to 8 and relate to an alternative form of construction;

FIG. 12 is a view in perspective of one of the elements of this alternative construction;

Figure 13:
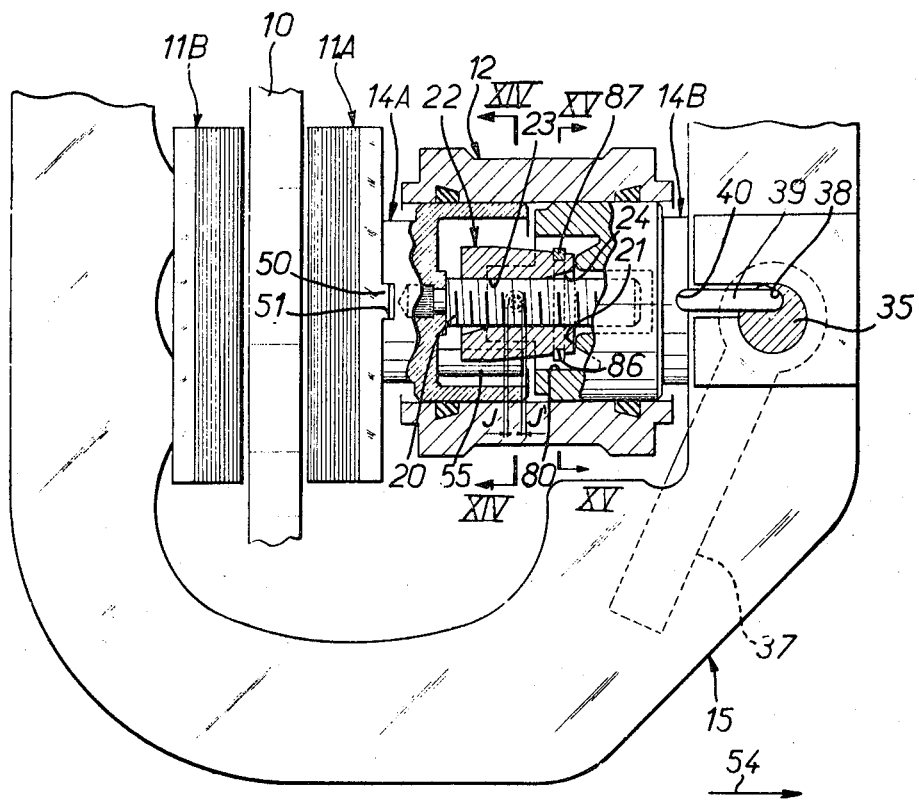
FIG. 13 is a partial view in plan of an alternative form of construction of a brake according to the invention, with parts broken away and certain parts removed.

In FIGS. 1 and 2 there has been shown diagrammatically and partially a disc brake of the kind comprising: a disc 10 rigidly fixed to the member to be braked; two brakeshoes 11A, 11B arranged on each side of this disc, and movable perpendicularly to this latter; an actuation unit 12 in which two pistons 14A, 14B slide in opposite direction under the control of a hydraulic control circuit (not shown in detail); and a transfer member 15 which, in the example shown, is a substantially flat ring which is developed round the unit 12 and the brakeshoes 11A, 11B, following a plane perpendicular to the disc 10.

The piston 14A acts directly on the shoe 11A, while the piston 14B acts on the shoe 11B through the intermediary of the transfer member 15.

The shoe 11A is provided with a projection 50 engaging in a groove 51 on the piston 14A, in order to prevent rotation of this piston.

The pistons 14A, 14B are coupled to each other by releasable unidirectional coupling means, for the automatic compensation of the play due to wear of the shoes 11A, 11B, during a braking action or during successive braking actions.

According to the form of construction shown in FIG. 2, these unidirectional coupling means comprise a screwed rod 20 carried in the interior of the piston 14A, in the axis of the actuation unit 12, and conjointly the piston 14B is provided with an annular transverse bearing surface 21, perpendicular to the said rod. A threaded core 22 is engaged on the rod 20. This core, shown separately in FIG. 4, is a so-called rapid release nut of the kind having a threaded bore 23 and additionally provided with a smooth bore 24 at an oblique angle to the threaded bore.

Thus, the threads of the bore 23 only exist in two diametrically opposite layers, one at each extremity of this bore.

The threads of the core 22 are complementary to those of the rod 20; they are conventional threads, as shown diagrammatically to a large scale in FIG. 5.

With the threaded core 22 are associated elastic means. In the form of embodiment of FIGS. 1 to 8, these means comprise a split socket 25, shown separately in FIG. 3.

At one of its extremities, this socket 25 has a small flange 26 which is anchored in a groove 27 of the piston 14B. At its other extremity it is provided on the one hand with a tongue 28 bent back radially towards the exterior and engaged in a notch 29 of the piston 14B, and on the other hand an elastically deformable tongue 30 bent back radially towards the interior and supported simultaneously against a transverse surface 31A of a slot 31 in the threaded core 22, and against the longitudinal side 31B of this slot.

By its tongue 28, the socket 25 is made fixed for rotation with the piston 14B; by its tongue 30 it ensures the fixing in rotation of the threaded core 22 with the piston 14B and elastically presses this threaded core 22 against the bearing surface 21 of the piston 14B, at the same time applying the threads of this core against the threads of the threaded rod 20.

By this means, the threads of the threaded core 22 are in engagement with those of the threaded rod 20, the piston 14B constituting by its flat face or bearing surface 21, a kind of locking means associated with the core 22.

The operation of a brake of this kind is as follows:

When a braking action is effected, fluid under pressure passes into the actuation unit 12 between the pistons 14A, 14B, and these latter are moved away from each other, which causes the gripping of the disc 10 by the shoes 11A, 11B.

For the sake of clearness of the explanation which follows, it will be assumed that the piston 14A remains fixed and that it is only the piston 14B which moves through a sufficient distance to ensure the gripping of the disc. It will also be assumed that this gripping action does not involve any wear of the brakeshoes.

During the course of its movement, the piston 14B drives the socket 25 which causes a rocking movement of the threaded core 22 about an axis perpendicular to that of the threaded rod 20. However, the core 22 remains in contact with the surface 21 of the piston 14B, due to the action of the elastic tongue 30 of the socket 25, and in practice of the threads of this core and of the rod 20 are so chosen that, during its rocking movement, the said core does not escape from the said rod in the absence of any wear of the brakeshoes.

When the braking action is released, the disc 10 is also released and the threads of the core 22 return into engagement with the threads of the threaded rod 20, from which they has moved away during the gripping of the disc.

It will now be assumed that during the course of such a gripping action, a certain wear of the brakeshoes takes place. This wear has the effect of accentuating the rocking movement of the core 22 with respect to the rod 20. If this rocking movement is sufficient for the threads of the core 22 to escape from those of the rod 20, there is a relative axial displacement of the core 22 with respect to the rod 20 and, when the disc 10 is released, the threads of the core 22 will come into engagement with threads of the rod different from the threads which they left during the braking action. The relative axial displacement of the core 22 with respect to the rod 20 was therefore irreversible.

In this way, the rod 20 and the core 22 ensure automatic compensation of the play due to wear of the shoes, the pistons 14A, 14B moving apart progressively from each other in an irreversible manner as and when this wear takes place.

During changing of brakeshoes after wear, it is necessary to return the pistons 14A, 14B to their initial positions by disengaging them from each other. In the form of construction shown, this disengagement is effected by "unscrewing" one of the pistons with respect to the other. As has been seen, the piston 14A is immobilized in rotation by the shoe 11A, which prevents any accidental "unscrewing" of this piston during working.

The unidirectional coupling means described above are particularly robust.

This robustness is particularly advantageous for the installation of the mechanical control which is described below.

On the transfer ring 15, a pivot 35 is pivotally mounted facing the piston 14B. The geometrical axis of this pivot, of which the outline T has been marked in the plan view of FIG. 1, is perpendicular to the ring 15 at a distance from the radial plane of symmetry of the brake, the outline of which is the straight line P in this FIG. 1.

On this pivot 35 is keyed an operating lever 37. The pivot 35 is provided with a longitudinal groove 38, on the concave bottom of which are supported two crankarms 39A, 39B, arranged on each side of the ring 15. These crank arms are plates, the mean plane of which is substantially coincident with the plane of symmetry P referred to above. At their other extremities, these crank arms are supported against the concrete bottom of a diametral slot 40 provided on the piston 14B.

At the level of the crank arms 39A, 39B, the ring 15 is reinforced by plates 41A, 41B added by welding, each of these plates being provided with a slot such as 42A for the passage of the corresponding crank arm.

The maintenance in position of the crank arms 39A, 39B is effected by a stirrup 45 engaged on the ring 15 on each side of the said crank arms. The assembly is completed by a Belleville elastic washer 46 and a retaining circlip 47, keyed axially on the pivot 35. In FIG. 1, for the sake of greater clearness of this drawing, the stirrup 45, shown in broken lines, the elastic washer 46 and the circlip 47 have been removed and the pivot 35 has been cut.

The method of bringing this mechanical control into operation is as follows:

When a braking action is applied, the operating lever 37 of the pivot 35 causes the latter to turn in the direction of the arrow 53 of FIG. 1. Due to the eccentric position of this pivot 35 with respect to the crank arms 39A and 39B, its rotation has the effect, on the one hand of causing a movement of the transfer ring 15 in the direction of the arrow 54 of FIG. 1, and on the other hand a reverse movement of the crank arms 39A and 39B in the direction of the arrow 55.

The movement of the ring has the effect of applying the shoe 11B against the disc.

The movement of the crank arms 39A and 39B has the effect of causing an equal overall movement of the pistons 14A, 14B in the same direction, the said pistons being coupled for this direction of movement by their associated unidirectional coupling means; in consequence, the shoe 11A is applied against the disc 10.

This latter is therefore gripped.

When the braking action is released, the disc 10 is freed.

There will now be described with reference to FIGS. 6 to 12, alternative forms of construction in which the disengagement of the pistons 14A and 14B during a changing of the shoes is rendered more rapid and therefore easier.

For this purpose, rocking means are provided which enable the threaded core 22 to be passed from its locked position in which its threads are in engagement with those of the threaded rod 20, to a position of disengagement in which the said threads are moved away from those of the threaded rod 20, the core 22 then bearing against the said rod by its smooth bore 24.

According to the form of construction shown in FIGS. 6 to 8, these rocking means comprise a rod 55 carried by the piston 14A parallel to the threaded rod 20, and conjointly the core 22 is provided longitudinally with a flat 56, due to which the rod 55 is developed when the core 22 is in the locked position. It is the threaded bore 23 of this core which is then in engagement with the rod 20.

The core 22 is elastically held in this locking position by the socket 25, which maintains it applied against the transverse bearing surface 21 of the piston 14B.

If the piston 14A is turned through a quarter of a turn FIG. 8 the rod 55 follows the flat 56 of the core 22 and, as this flat serves as a cam surface, it comes to bear against the periphery of the said core 22. The latter is thus compelled to rock against the elastic force applied by the tongue 30 of the socket 25.

Due to this rocking movement, the core 22 comes to bear against the rod 20 by its smooth bore 24; it is disengaged.

It is then only necessary to rotate one of them through a quarter of a turn with respect to the other in order to free the pistons from each other.

The core 22 is preferably frustoconical, so that the rod 55 always bears on the extremity of this latter which is the nearest to the piston 14A. This arrangement makes it possible to ensure that the application of the rod 55 against the core 22 is always effected at the same place on this latter during the course of its rotation, irrespective of the degree of wear of the brakeshoes.

According to the alternative form of construction shown in FIGS. 9 to 12, the elastic socket 25 comprises, in addition to the tongue 30 by which in particular it applies the core 22 against the bearing surface 21 of the piston 14B, and the tongue 28 which fixes it for rotation with the said piston, two elastically deformable tongues 60 and 61 bent back towards the interior, and applied against the periphery of the core 22.

These tongues 60 and 61 are axially staggered with respect to each other, so that they subject the core 22 to a rocking torque with respect to the rod 20, about an axis perpendicular to this rod.

In the position of rocking shown in FIGS. 9 and 10, this rocking torque assists in maintaining the threads 23 of the core 22 in engagement with those of the threaded rod 20.

As in the previous case, the piston 14A carries a small rod 55 parallel to the threaded rod 20, and this small rod is housed in a longitudinal groove 64 of the core 22.

If the piston 14A is rotated by half a turn with respect to the piston 14B, the rod 55 compels the core 22 to rotate also through half a turn (FIG. 11) and from that moment the rocking torque to which it is subjected causes it effectively to rock, the smooth bore of the core 22 coming into application against the rod 20; the core 22 is disengaged.

There will now be described with reference to FIGS. 13 to 17 alternative forms of construction of the elastic means and the locking means associated with the core 22.

In these figures, the elements identical with those described with reference to the previous figures have been given the same reference numbers.

According to these alternative constructions, the core 22 is coupled to a locking member associated with the piston 14B.

Figure 14:
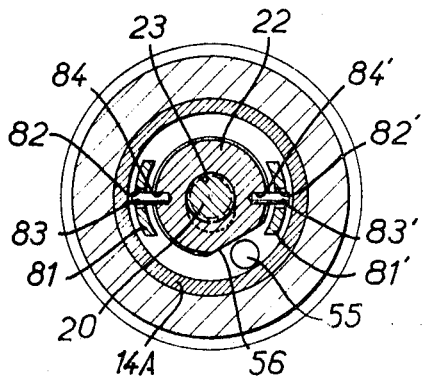
FIGS. 14 and 15 are partial views in cross section of this alternative construction, taken respectively along the lines XIV—XIV and XV—XV of FIG. 13.
Figure 15:
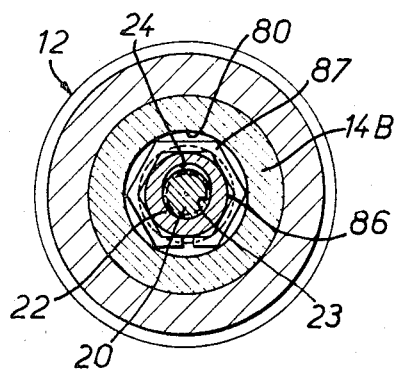

According to the form of construction shown in FIGS. 13 to 15, this locking member forms an integral part of the piston 14B.

To this end, the latter is provided with an axial housing 80 in which the core 22 is partly engaged, and the wall of which is extended axially by two arms 81 and 81' which enclose the core 22. Each of these arms is pierced with a hole 82 and 82' respectively, and the core is provided radially, in opposite direction, with two fingers or studs 83, 83', which are a driving fit in housings 84, 84' of the core 22 and which pass through the holes 82, 82' of the arms 81, 81' with a clearance J on the side of the piston 14A and a clearance J' on the side of the piston 14B. Fingers or studs 83, 83' of this kind may for example be constituted by split pins.

In the axial housing 80 of the piston 14B, the core 22 is provided with an annular groove 86. An elastic keeper-ring 87 with circumferential symmetry is engaged in this groove 86; it is supported internally on the bottom of the groove 86 of the core 22 and externally on the axial wall of the housing 80 of the piston 14B.

In accordance with the example shown, this elastic ring 87 is a hexagonal ring; however, any other shape having circumferential symmetry may be suitable for a ring of this kind.

As previously, the brake further comprises a mechanical control.

According to the form of construction shown in FIGS. 13 to 15, and as described above, this mechanical control is interposed between the piston 14B and the transfer member 15. It comprises a pivot 35 which is perpendicular to the transfer member 15, and on which is keyed a control lever 37. This pivot 35 has an eccentric groove 38, against the bottom of which is supported a crank arm 39 which is also engaged in a diametral groove 40 of the piston 14B.

The hydraulic operation of the alternative construction described above is as follows:

During waiting periods, as shown, the elastic keeper-ring 87 tends to hold the core 22 centered on the axis of the axial housing 80 of the piston 14B, and therefore to maintain the threads of the bore 23 of this core in engagement with the threads of the threaded rod 20.

It will be observed that the zones of the threaded bore 23 by which the core 22 is in engagement with the threaded rod 20 are arranged axially, on each side of the radial fingers or studs 83, 83' of this core 22 in an oblique direction with respect to the axis of this core. The result is that if a tractive effort is applied axially on the core 22, this latter is the seat of a rocking torque about an axis perpendicular to the threaded rod 20.

When a braking action is applied, fluid under pressure passes into the actuation unit 12 between the pistons 14A and 14B, and these latter move apart from each other, thus causing gripping of the disc 10 by the shoes 11A and 11B.

During the course of its movement, the piston 14B drives the notched core 22 by the radial studs 83, 83' of this latter, after absorbing the clearance J existing between the studs and the associated holes 82, 82', and this core rocks about an axis perpendicular to the threaded rod 20, this rocking movement being due to the rocking torque referred to above. This rocking movement is effected in opposition to the elastic keeper-ring 87 which tends to maintain the core 22 centered on the axis of the axial housing 80 of the piston 14B. During such a rocking movement and as long as no wear of the brakeshoes takes place during the course of the braking considered, the said core 22 does not escape from the rod 20.

When the braking action is released, the threads of the core 22 return into engagement with the threads of the threaded rod 20, from which they have moved away during the gripping of the disc, and the disc 10 becomes freed by the clearance J.

If a certain wear of the brakeshoes 11A and 11B occurs during a braking action, the rocking of the core 22 with respect to the threaded rod 20 becomes accentuated, and if this rocking movement is sufficient for the threads of the core 22 to escape from those of the rod 20, there is a relative axial movement of the core 22 with respect to the rod 20 in proportion to the said wear, the said core being retained by the arms 81 and 81' of the piston 14B, after absorption of the clearance J between the studs 83, 83' of the said core and the holes 82, 82' of the said arms.

When the disc 10 is released, the threads of the core 22 come into engagement with threads of the rod 10 different from the threads from which they escaped during the braking action. The relative axial displacement of the core 22 with respect to the rod 20 has therefore been irreversible.

It will have been observed that whatever the wear may be, the disengagement of the brake is ensured by virtue of the clearance J.

With regard to the clearance J', this makes it possible to ensure that during release of the brakes, the piston 14B which forms the locking member of the core 22, is supported against the extreme transverse face of this latter without being in contact with the studs 83, 83' carried by this core.

The operation of the mechanical control of the present alternative construction will now be briefly described.

When a braking action is effected, the control lever 37 rotates the control pivot 35, and this rotation has the effect of causing on the one hand a movement of the transfer ring 15 in the direction of the arrow 54 of FIG. 13, and on the other hand a reverse movement of the crank arm 39. The movement of the transfer member 15 has the effect of applying the shoe 11B against the disc 10. The movement of the crank arm 39 has the effect of causing the equal and overall movement of the pistons 14A and 14B, which are coupled to each other in this movement by the unidirectional coupling means explained above, the force transmitted to the core 22 by the flat face 21 of the piston 14B ensuring the intimate engagement of the threads of this core with those of the threaded rod 20, which is an advantage in the case of a disc brake, for which the forces to be transmitted by the mechanical control are large. There is therefore an application of the shoe 11A against the disc 10.

This disc is therefore gripped.

When the braking action is released, the disc 10 becomes freed.

As a safety measure, and with the object of preventing possible eccentricity of construction undesirable for the flat face 21 of the piston 14B, or with the object of of obtaining a certain self-application of the brakes, in an alternative form of construction (not shown), the point of application of the flat face or bearing surface 21 of the piston 14B on the core 22 is previously made eccentric in a direction from the axis of the threaded bore of this core to the axis of the smooth bore of the core.

This arrangement makes it possible to ensure that the threads of the core 22 are fully engaged in the threads of the rod 20.

The eccentricity in question can be obtained for example by displacing in the direction stated above the ring constituted by the flat face 21 of the piston 14B with respect to the axis of this latter, or alternatively by giving this ring a chamfer which eliminates a part of it in a direction opposite to that preceding.

As described above and in accordance with the form of construction illustrated in FIGS. 13 to 15, the core 22 has a frustoconical external surface provided with a flat 56. At the level of this flat, the piston 14A carries a rocking rod 55 parallel to the threaded rod 20.

If a rotation through a quarter turn is applied to the piston 14B and therefore to the core 22, the rocking rod 55 comes to bear against the outer surface of the core 22 beyond the flat 56 of this latter, and then compels this core to rock about an axis perpendicular to the threaded rod 20. During such a rocking movement, and as described above, the core 22 escapes form the rod 20. The unidirectional coupling means interposed between the pistons 14A and 14B are then disengaged and the pistons can be moved freely with respect to each other, for example for the purpose of replacement of the brakeshoes 11A and 11B.

Figure 17:
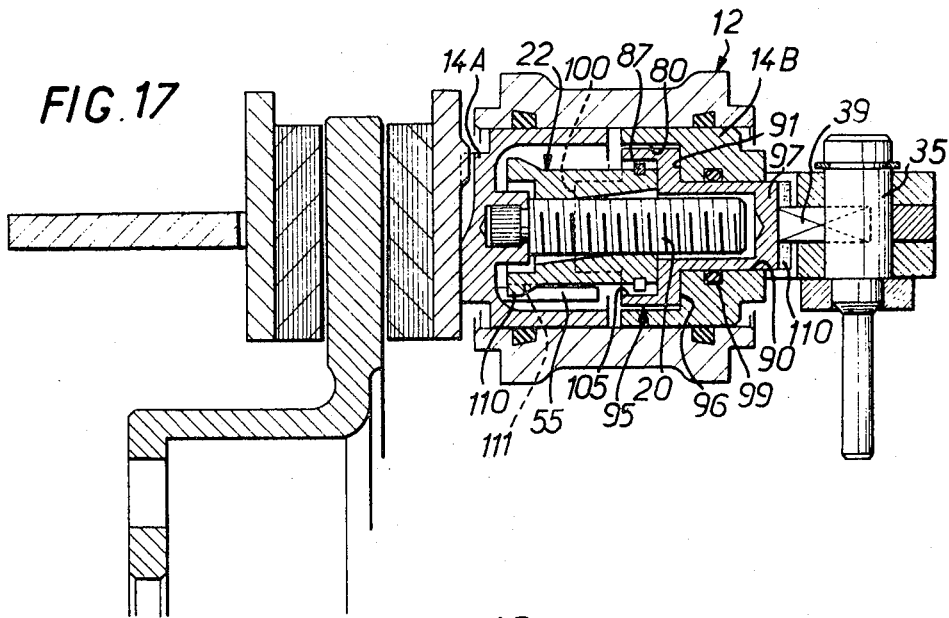
FIG. 17 is a view in axial section of this alternative form, taken along the line XVI—XVI of FIG. 16.
Figure 16:
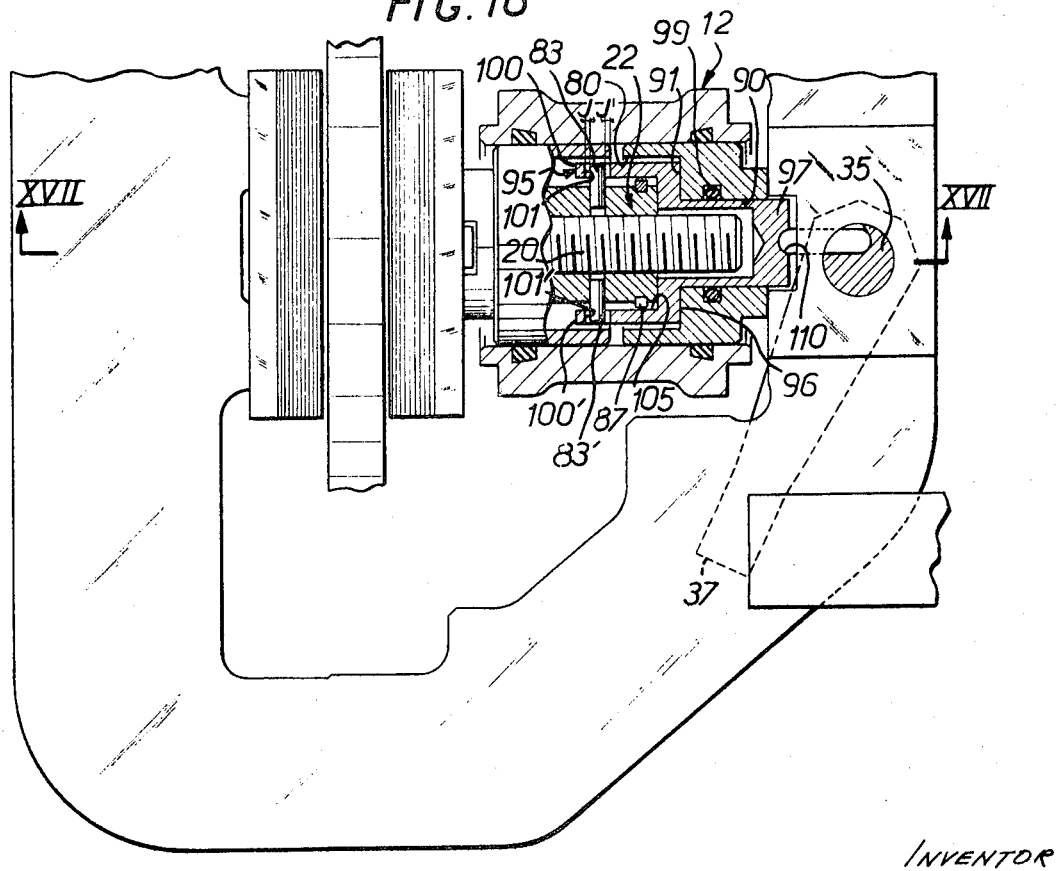
FIG. 16 is a view similar to FIG. 13 and relates to another alternative form of construction.

FIGS. 16 and 17 relate to an alternative form of construction, in which the locking member of the core 22 is a part independent of the piston 14B. The piston 14B is provided with an axial passage 90, and the bottom of its axial housing 80 forms a transverse shoulder 91 perpendicular to its axis.

In the housing 80 of the piston 14B is engaged a tubular locking member 95 which has a transverse bearing surface 96 opposite the shoulder 91 of the piston 14B for contact with this shoulder, and which, beyond this transverse bearing surface 96, has an axial extension 97 slidably engaged in the axial passage of the piston 90. A toric joint 99 ensures the fluid-tightness of this assembly.

The locking member 95 is provided with two arms 100, 100', similar to the arms 81 and 81' described above. They are provided with two holes 101, 101', in which are engaged with clearances J and J' the radial fingers or studs 83, 83' of the notched core 22. This latter is engaged in the axial housing 105 formed by the locking member 95 and in this housing an elastic keeper-ring 87 having circumferential symmetry ensures the centering of the core 22, as previously.

The crank arm 39 of the mechanical control is interposed between the pivot 35 which is keyed on the control lever 37, and a groove 110 cut diametrically at the free extremity of the axial extension 97 of the locking member 95.

The hydraulic operation of the present alternative form of construction is similar to that described above. It is only necessary to emphasize that during braking, the hydraulic pressure in the interior of the actuation unit 12 applies its effects both on the piston 14B and on the locking member 95, and that in consequence the latter follows the movements of the said piston and by its bearing surface 96, remains in contact with the shoulder 91 of this piston, the disengagement of the brake being rendered possible, as previously, by the clearance J.

According to an alternative form (not shown), elastic means such as springs may be interposed between the piston 14A and the locking member 95 in order that the latter remains in contact with the piston 14B, even outside the braking periods.

The mechanical operation of the present alternative is also similar to that described with reference to FIG. 13.

It will however be emphasized that this operation is effected through the intermediary of the locking member 95, that is to say independently of the piston 14B, whatever the position of this latter may be with respect to the piston 14A. This operation is thus advantageously practically independent of the hydraulic pressure existing in the actuation unit 12.

Thus, if the mechanical control of the brake is put into action at a moment when the hydraulic control is also in action, this mechanical control retains all its effectiveness of braking action when the hydraulic control is released, the effort to be developed by the mechanical control in opposition to the hydraulic pressure then existing in the actuation unit being advantageously reduced.

As regards the disengagement of the unidirectional coupling means with which the pistons 14A and 14B of the alternative construction shown in FIGS. 16 and 17 are equipped, this is ensured as previously by a rocking rod 55 carried by the piston 14A.

However, according to this alternative form, the core 22 has a cylindrical outer surface and at that of its extremities which is the nearest to the piston 14A, it comprises an annular bead 110 provided with a flat 111 with which the rocking rod 55 cooperates.

This arrangement makes it possible to give the core 22 a greater axial dimension, without appreciable increase in its diametral size.

The present invention is of course not limited to the forms of construction described and shown, but includes any alternative construction and/or any combination of their various elements.

In particular, it may be advisable in certain cases to give the rod 20 an axial clearance with respect to the piston which carries it, while leaving this rod keyed for rotation on the said piston.

In addition, the threaded rod 20 and the threaded core 22 or the threaded socket 72 could be replaced respectively by similar elements which are notched instead of being threaded, the word notched being understood in this case in a very general sense including the meaning of the word thread, a thread being nothing more than a notch continued as a helix. Only the alternative form of construction shown in FIGS. 1 to 5 must comprise a rod 20 and a core 22 which are really threaded, since the disengagement of these members with respect to each other necessitates them being unscrewed.

Finally, as regards the alternative forms of FIGS. 13 to 17, it has been indicated that the groove 86 in which the elastic ring 87 is placed is cut in the notched core 22; according to an alternative construction (not shown), this groove 86 is cut in the locking member associated with the notched core 22.

What we claim is:

1. A disc brake of the type including a disc mounted for rotation with a member to be braked, a brakeshoe disposed on each side of said disc and movable perpendicular thereto, an actuation unit including two pistons mounted for sliding movement perpendicular to the disc, one of said pistons acting directly on one of said brakeshoes, a transfer member operatively connected between the other of said pistons and the other of said brakeshoes for transmitting force to the other of said brakeshoes, a mechanical control and automatic means for taking up the play due to brakeshoe wear mounted in said actuation unit and comprising a rod carried by a first of said pistons along the axis of the actuation unit and having at its periphery ratchet members, a core having an axial bore with ratchet members complementary to the ratchet members of said rod and engaged with said rod, said core having also a smooth bore intersecting said axial bore obliquely, locking means actuated by the mechanical control for bringing the ratchet members of said core into engagement with the ratchet members of said rod and including a flat face perpendicular to the axis of the actuation unit cooperating with the transverse face of the core nearest to the second of said pistons, and resilient means urging the ratchet members of said core toward the ratchet members of said rod.

2. A disc as claimed in claim 1, wherein the ratchet members on the rod and core comprise complementary sets of teeth.

3. A disc brake as claimed in claim 1 wherein the locking means is said second piston, and wherein said mechanical control acts between said transfer member and said second piston.

4. A disc brake as claimed in claim 1, wherein the locking means of said core are constituted by a locking member comprising an extension which passes through said second piston, and in that said mechanical control acts between said transfer member on the one hand and said extension of the locking member on the other.

5. A disc brake as claimed in claim 1, wherein the resilient means associated with said core comprise a split socket arranged round the core, said socket having on the one hand an elastic tongue bent back towards the interior so as to be supported on the core along a transverse bearing surface of said core, said elastic tongue being also supported against an axial bearing surface of said core, and on the other hand a tongue bent back towards the exterior and engaged in a slot of said piston for rigid fixing for rotation with said piston, said socket further comprising an end flange by which it is anchored on said second piston.

6. A disc brake as claimed in claim 1, wherein the ratchet members of said core and rod are continuous threads.

7. A disc brake as claimed in claim 1, wherein said rod is mounted with axial clearance on said first piston and is keyed for rotation on said piston.

8. A disc brake as claimed in claim 1, wherein the first piston acts directly on one brakeshoe and the second piston is that which acts on said transfer member.

9. A disc brake as claimed in claim 1, wherein said mechanical control comprises a pivot member rotatably mounted in said transfer member along an axis perpendicular to the axis of said actuation unit and spaced from said axis, a control lever keyed on said pivot member, and at least one crank arm pivotally mounted on said second piston and said pivot member.

10. A disc brake as claimed in claim 9, wherein said crank arm has convex ends in pivotal engagement in concave housings on said second piston and on said pivot member.

11. A disc brake in accordance with claim 9, wherein said transfer member is a substantially flat ring, wherein crank arms are arranged on each side of said ring between said second piston and the pivot member of said mechanical control, said ring being reinforced at said pivot member by two plates slotted for receiving the crank arms, said crank arms being arranged between the arms of a retaining stirrup engaged on said pivot member on each side of said ring.

12. A disc brake as claimed in claim 1, wherein the locking means comprises a locking member provided laterally with at least one hole, and wherein said core carries transversely a radial finger engaged with clearance in said hole.

13. A disc brake as claimed in claim 12, wherein the locking member of said core has an axial housing in which said core is engaged, at least in part, one of the locking and core members having an annular groove, and the associated resilient means comprises a circumferentially symmetrical keeper ring engaging said groove, said ring being supported at the bottom of said groove and on the axial wall of the other of said locking and core members.

14. A disc brake as claimed in claim 12, wherein the locking member is integral with said second piston.

15. A disc brake as claimed in claim 12, wherein the mechanical control is interposed between the driving member of said core and another member of the brake.

16. A disc brake as claimed in claim 12, wherein said second piston comprises an axial housing extended beyond a transverse shoulder by an axial passage, and the locking member of the core is an independent part of said second piston, said part comprising a transverse bearing surface facing the shoulder of said piston, and beyond said bearing surface, an axial extension engaged in the axial passage of said piston.

17. A disc brake as claimed in claim 16, and elastic means between said first piston and the locking member of said core, for the application of said locking member against said second piston.

18. A disc brake as claimed in claim 1, further comprising rocking means associated with said first piston to rock said core about an axis perpendicular to said rod when said piston is pivoted about its axis through a predetermined angle.

19. A disc brake as claimed in claim 18 wherein said rocking means comprises a small rod carried by said first piston, parallel to said rod.

20. A disc brake as claimed in claim 19, wherein the core has a longitudinal flat, the small rod of said rocking means being at least partly disposed in the space corresponding to said flat.

21. A disc brake as claimed in claim 19, wherein the peripheral surface of said core is frustoconical, so that the rod of said rocking means only comes into contact with said core at its closest approach to the piston carrying said rod.

22. A disc brake as claimed in claim 19, wherein said core is externally cylindrical and has an annular bead at that one of its extremities which is the nearest to said first piston, said bead being associated with a flat with which cooperates the rod of said rocking means.

23. A disc brake as claimed in claim 19, wherein the rod of said rocking means is engaged in a groove of said core, and said rocking means further comprise at least two elastic rocking tongues acting on said core and displaced with respect to each other along the axis of said core.

24. A disc brake as claimed in claim 23, wherein said two elastic rocking tongues are carried by a split socket which surrounds the core.

* * * * *